United States Patent
Taylor

[15] 3,677,119
[45] July 18, 1972

[54] FLYING SHEAR

[72] Inventor: Julian S. Taylor, 8600 S.W. 8, Oklahoma City, Okla. 73128

[22] Filed: Oct. 5, 1970

[21] Appl. No.: 77,952

Related U.S. Application Data

[63] Continuation-in-part of Ser. No. 774,112, Nov. 4, 1968.

[52] U.S. Cl. ................................................83/316, 83/632
[51] Int. Cl. .........................................................B23d 25/06
[58] Field of Search ...........................83/316, 317, 318, 632

[56] References Cited

UNITED STATES PATENTS 2,436,572   2/1948   Henschker ...........................83/316 X

*Primary Examiner*—James M. Meister
*Attorney*—Robert K. Rhea

[57] ABSTRACT

In a flying shear an upright frame is provided with an opening forming a passageway for moving stock to be cut. A stationary blade is mounted on the frame above the opening. A movable blade is reciprocably mounted on the frame for movement toward and away from the stationary blade by a pitman connected with a crank arm coaxially connected with a gear wheel journalled by the frame. Spaced-apart spur gears, mounted on the frame in mesh with the gear wheel, are respectively connected with and driven by a pair of power cylinders for moving the pitman in a to and fro stock cutting stroke in response to shear signal operated electrical and pressure responsive valve means connected with the power cylinders and a control operated cog wheel interposed between the spur gears. Frame connected tilting cylinders, energized with the shear signal, tilt the frame in the direction of stock movement during the cutting action.

7 Claims, 13 Drawing Figures

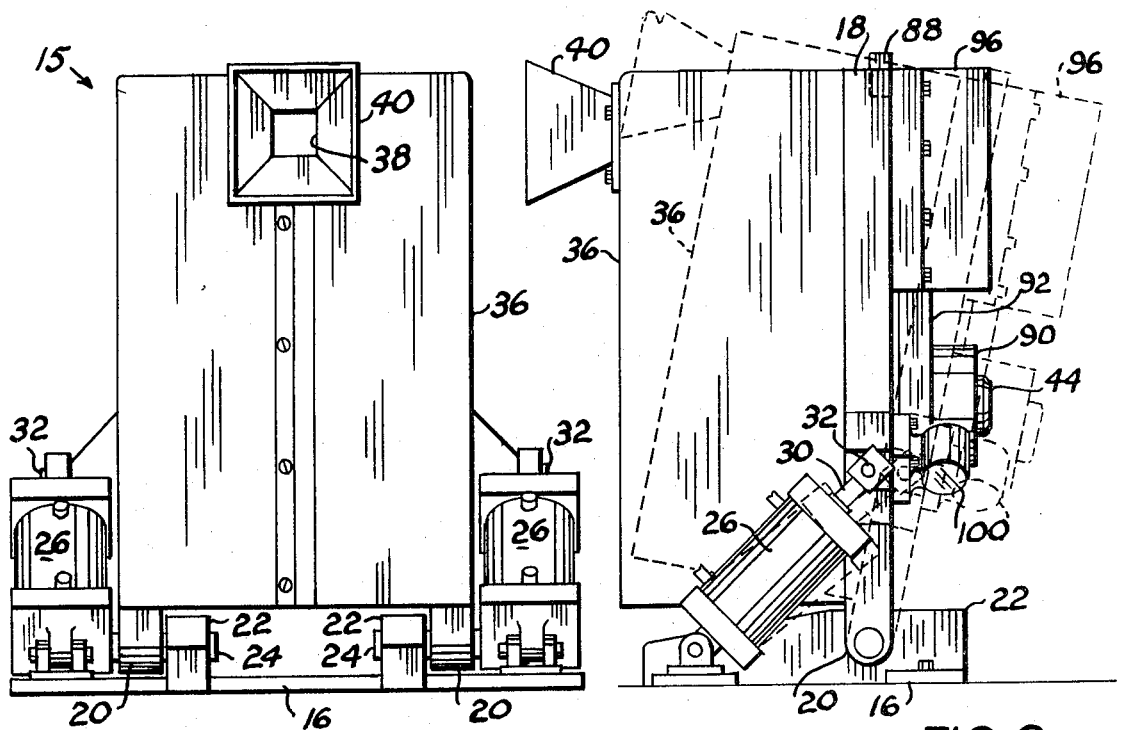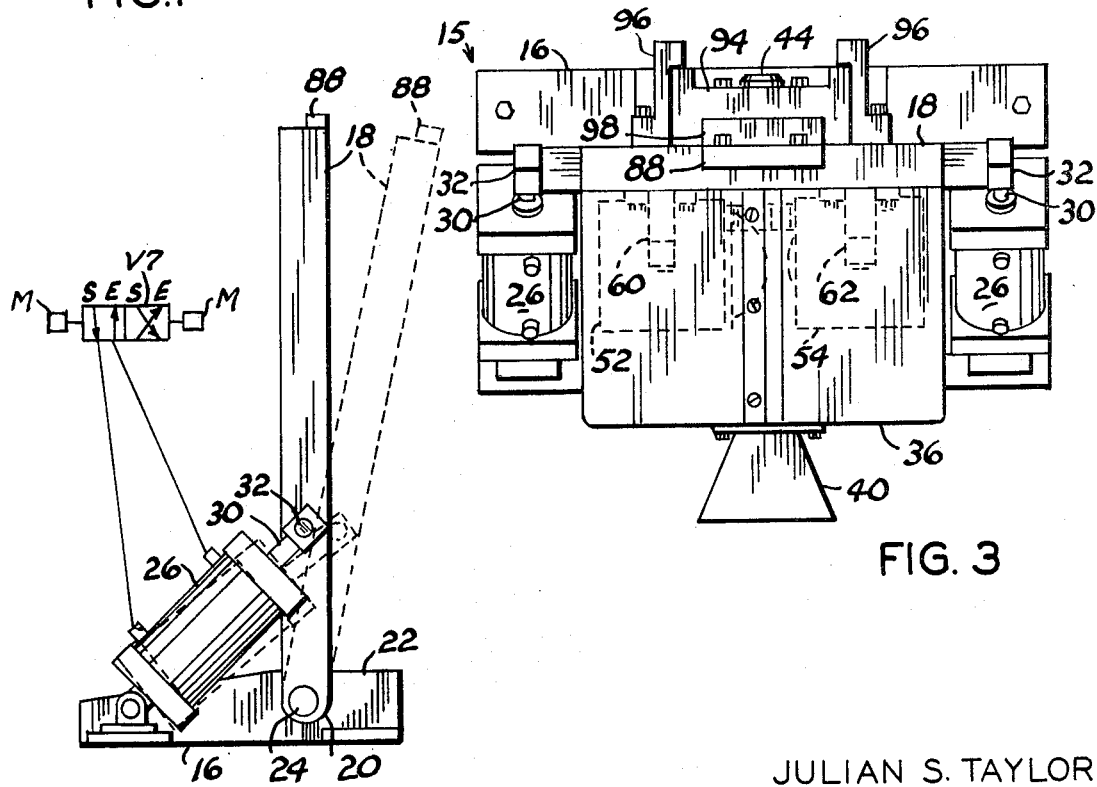

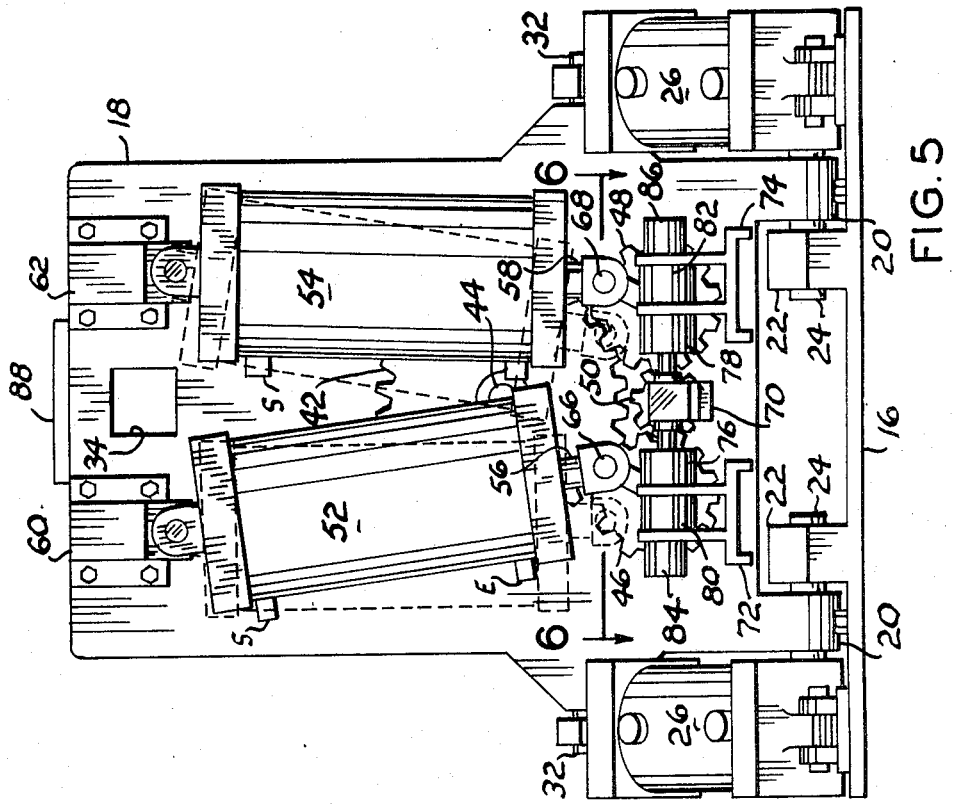
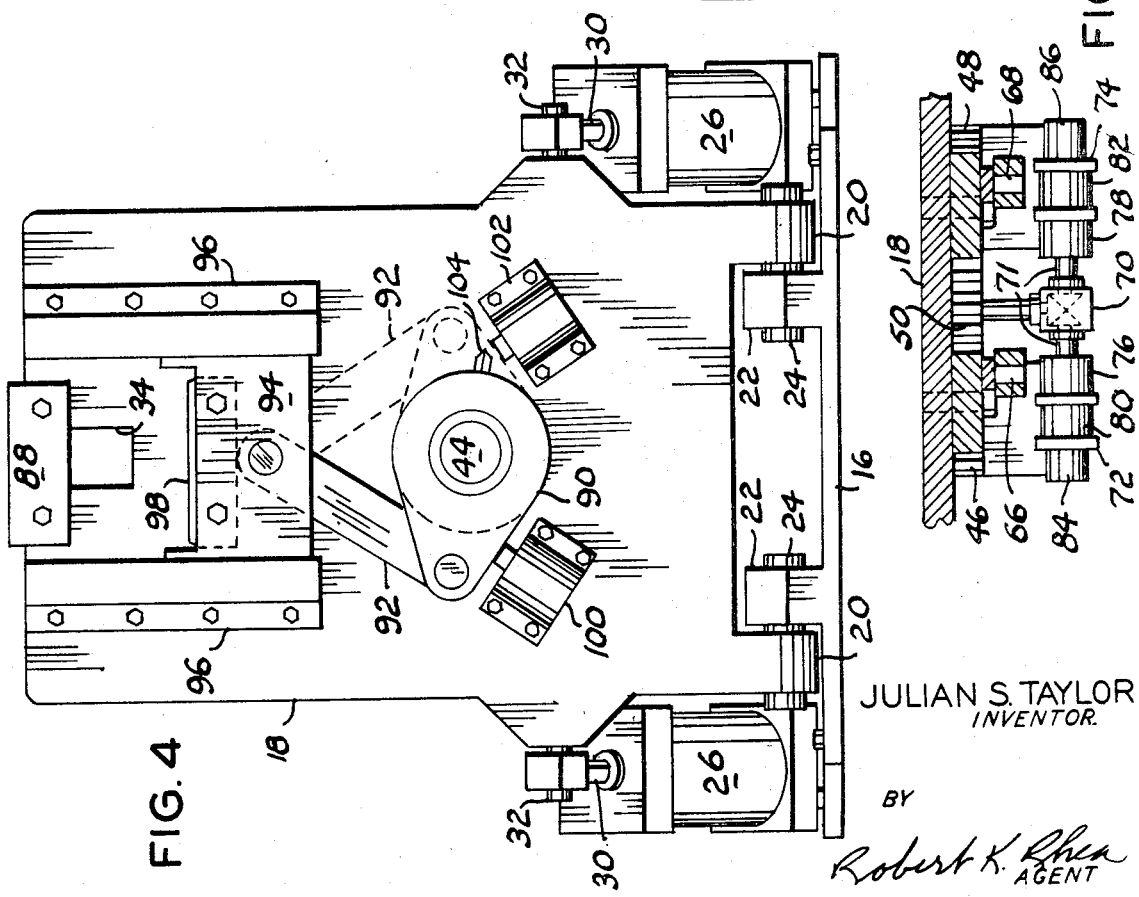

JULIAN S. TAYLOR
INVENTOR.

BY
Robert K. Rhea
AGENT

JULIAN S. TAYLOR
INVENTOR.

BY
Robert K. Rhea
AGENT

JULIAN S. TAYLOR
INVENTOR.

BY
Robert K. Rhea
AGENT

FLYING SHEAR

CROSS REFERENCE TO RELATED APPLICATION

The present invention is a continuation-in-part of an application filed by me in the U.S. Patent Office on Nov. 4, 1968 under Ser. No. 774,112 for Flying Shear.

BACKGROUND OF THE INVENTION

1. Field of the Invention

The present invention relates to a device for cutting longitudinally moving stock and more particularly to a flying shear.

In production of steel by rolling mills, such as elongated bars, the lead portion of the bars tend to fray or split and it is necessary that this split end portion be trimmed off the bar while the latter is heated to at least a cherry red temperature for subsequent movement of the bar through finishing processes. This is usually accomplished by a flying shear which is actuated by the presence of the bar stock. In the rolling or processing of steel it is also desirable to shear the bars to shorter lengths without interrupting or slowing down the process. A flying shear is used for this purpose. Most of the flying shears presently in use generate potential energy to effect the shear by a motor driven flywheel or by large direct current motors. These machines presently in use are relatively large and expensive.

The principal distinction of this invention over my above mentioned copending application resides in the means for effecting the shear stroke wherein one of the blades is mounted on a frame and the other blade is moved toward and away from the stationary blade by a pitman controlled by reciprocating movement of power cylinder operated gears. The reciprocating action of the gears thus shortens the time delay normally required for a complete revolution of shear blade connected cog wheels disclosed in my copending application. Furthermore, this invention utilizes air pressure remaining in the power cylinders, after the cutting stroke, as a cushion for stopping rotative movement of the gears and positioning the movable blade for a subsequent stroke.

2. Description of the Prior Art

Flying shears, as disclosed by prior patents, for the most part, disclose a pair of cutting blades mounted on or connected with a pair of rotating gears or cog wheels wherein rotation of the gears position the shear blades in opposing relation for cutting a piece of moving stock disposed between the blades. This type of shear operates satisfactorily except for the time lag required to reposition the shear blades for a subsequent cuting stroke.

U.S. Pat. Nos. 1,816,187; 2,764,238 and my U.S. Pat. No. 3,410,163 as well as my above referred to copending application feature such gear mounted or actuated cutting blades. This invention uses a series of rotating gears which feature an incomplete rotation of the blade actuating gear which is partially rotated in first one direction and then the other through only a portion of a complete revolution for moving one cutting blade toward and away from a stationary blade thus reducing the time lag required for repositioning the moving blade to a shear start position.

SUMMARY OF THE INVENTION

An upright support is mounted on a base frame and provided with a stationary cutting blade positioned above an aperture in the support through which stock to be cut is progressively moved. A driven gear is journalled by the support below the opening therein and is coaxially connected with a crank arm connected to a moving shear blade by a connecting rod wherein the movable blade is slidably supported by the frame below the stock passing opening. Stops mounted on the support limit the movement of the crank arm to a back and forth reciprocating incomplete revolution movement. Spur gears, mounted on the support in spaced-relation and in mesh with the driven gear, are connected with the piston rods of a pair of power cylinders mounted on the support for partially rotating the spur gears in first one direction and then the other to move the movable cutting blade toward and away from the stationary blade. A cog wheel, interposed between the spur gears and meshing with the latter, is connected with a right angle gear train controlled by a cam clutch and air brake to release and stop the rotation of the spur gears in response to actuation of shear signal generating means comprising air control valves and centrifugal switches. Pressure cylinders, mounted on the base and connected with the upright support, are actuated with the shear signal means for tilting the support in the direction of stock movement during the shearing action.

The principal object of this invention is to provide a flying shear having a movable blade reciprocated toward and away from a stationary blade by power cylinders operating gears and moving a crank arm connected with the movable blade in a to and fro action.

BRIEF DESCRIPTION OF THE DRAWINGS

FIG. 1 is a front elevational view of the shear;

FIG. 2 is a right side elevational view of FIG. 1 illustrating, by dotted lines, the tilting movement of the shear frame during a shearing action;

FIG. 3 is a top view of FIG. 1 illustrating, by dotted lines, the relative position of the shear power cylinders with respect to the shear frame;

FIG. 4 is a rear elevational view of the shear to a larger scale;

FIG. 5 is a front elevational view, to a similarly enlarged scale, with the power shear cylinder cover removed;

FIG. 6 is a fragmentary horizontal cross-sectional view, partially in elevation, taken substantially along the line 6—6 of FIG. 5;

FIG. 7 is a diagrammatic side elevational view illustrating the control for and the tilting movement of the shear frame in the direction of the stock movement during a stock cutting action;

DESCRIPTION OF THE PREFERRED EMBODIMENT

Figure 8:
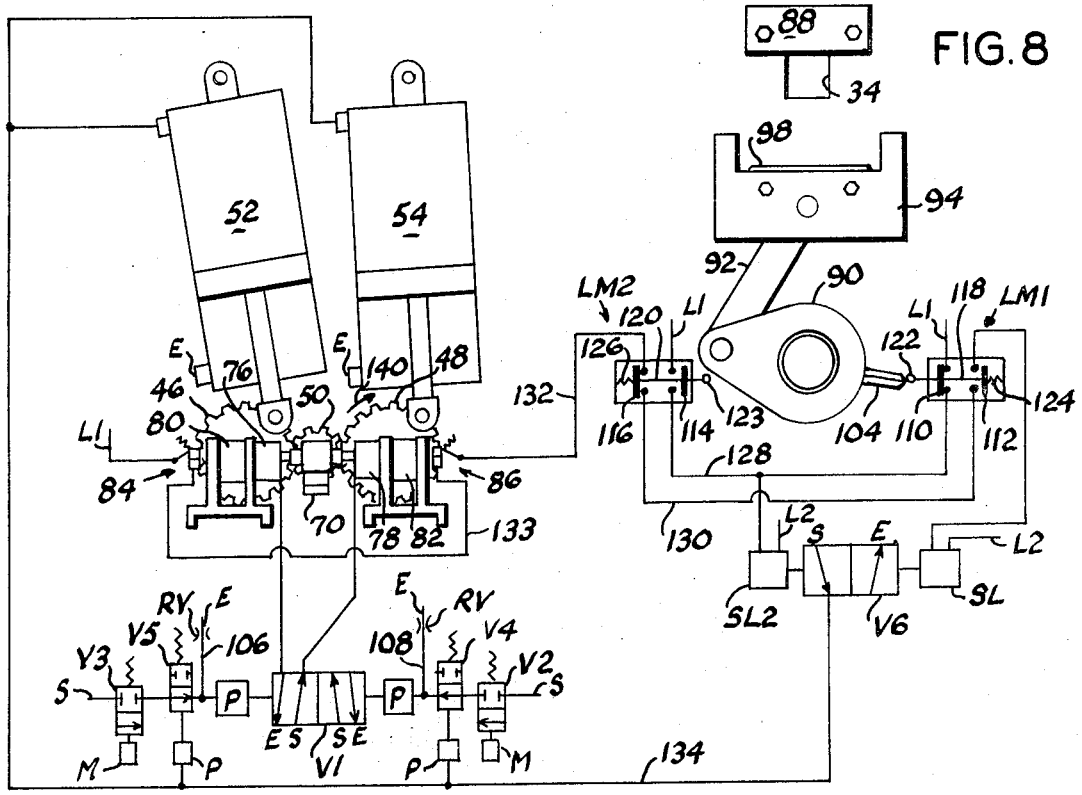
FIG. 8 is a diagrammatic view of the front and rear shear actuating components connected with pressure control means with the power end of the power cylinders under pressure and the shear in an at-rest position.

Like characters of reference designate like parts in those figures of the drawings in which they occur.

In the drawings:

The reference numeral 15 indicates the shear, as a whole, comprising a frame defined by a horizontally disposed base 16 and an upright plate-like support 18. The depending edge surface of the support 18 is provided with a pair of depending ears 20 positioned on respective opposing sides of a pair of spaced-apart webs 22 formed on the base and connected in clevis-like fashion by horizontal pins 24 which permits vertical pivoting movement of the support 18 about the horizontal axis defined by the pins 24 for the purposes presently explained.

A pair of pressure operated tilting cylinders 26 are pivotally connected, by their base or power end, to marginal side portions of the base 16 in a conventional manner. Each of the tilting cylinders includes a piston rod 30 which is pivotally connected to lateral projections of the support 18 by a pin 32. The purpose of the tilting cylinders 26 is to tilt the support 18 from the solid line position toward the dotted line position shown in FIGS. 2 and 7, during the stock shear or cutting action as more fully explained hereinbelow.

The frame is positioned so that the vertical plane of the support 18 is perpendicular to the longitudinal axis of stock to be cut, not shown. Adjacent its upper limit the support 18 is provided with an opening 34 for loosely receiving and passing stock to be cut. A box-like cover or housing 36 is secured to the forward side surface of the support 18 for shielding shear components to be presently described. The cover 36 is provided with an opening 38 in horizontal alignment or register with the support opening 34. A funnel-like guide 40 surrounds the cover opening 38 for guiding the leading end of stock to be cut into and through the openings 38 and 34.

A driven gear 42, having a toothed periphery, is mounted for rotation on the forward face of the support intermediate its vertical height by an axle 44 extending through and journalled by the support 18. A pair of spur gears 46 and 48 are similarly mounted on the forward face of the support 18 in spaced-apart relation on respective sides of a vertical center line on the forward surface of the support 18 taken through the axis of the axle 44. The spur gears 46 and 48 are in mesh with the driven gear 42. A cog wheel 50 is interposed between the spur gears 46 and 48 in mesh with the latter. A pair of pressure operated power cylinders 52 and 54, each having a piston rod 56 and 58, respectively, are pivotally connected by their power end with a pair of brackets 60 and 62, respectively, secured in spaced-apart relation to the forward surface of the support 18 adjacent its upper limit on opposing sides of the stock receiving opening 34. The power cylinder piston rods 56 and 58 are each pivotally connected by pin brackets 66 and 68, respectively, secured to the face of the respective spur gear 46 and 48 adjacent their peripheries in cooperating relation for simultaneously rotating the spur gears and effecting a cutting stroke when the power cylinders 52 and 54 are actuated in the manner presently explained.

The cog wheel 50 is coaxially connected with a conventional right angle "T" gear train 70 having oppositely rotating out-put shafts 71 and a gear ratio of 1:1 (FIG. 6). A pair of support brackets 72 and 74 are horizontally secured to the lowermost portion of the support 18 in aligned relation on respective sides of the gear train 70. The brackets 72 and 74, respectively, support a pair of conventional air brakes or clutches 76 and 78 connected with the gear train 70 and in turn connected with a pair of conventional one-way cam clutches 80 and 82. A pair of conventional centrifugal switches 84 and 86, respectively, supported by the brackets 72 and 74 are connected with the air clutches 76 and 78. The shaft, not shown, of each centrifugal switch 84 and 86, respectively, is connected to the shaft, not shown, of the respective cam clutch 80 and 82 which are respectively connected to each shaft, not shown, of the respective air clutch 76 and 78. The shafts, not shown, of the respective air clutches 76 and 78 are connected to the respective out-put shafts 71 of the gear train 70 when the respective air clutch is energized for the purpose hereinafter described. The contacts of the centrifugal switches 84 and 86 are interposed in the electrical circuit forming a part of the shear control, as hereinafter described more fully.

The air clutches 76 and 78 in addition to being connected with the gear train 70 have their ports connected with the pressure control means which selectively releases and applies pressure to the air clutches permitting rotation of the cog wheel 50 and spur gears 46 and 48 as presently described.

The one-way cam clutches 80 and 82, respectively, function to permit an incomplete revolution of the spur gears 46 and 48 in first one direction and then in a reverse direction when the power cylinders 52 and 54 are released by the air clutches 76 and 78 in the manner presently explained. The cam clutches 80 and 82, by their respective connection with the gear train output shafts 71, act as a brake on the spur gears 46 and 48 in first one direction and then the other direction to prevent reverse rotation of the gears until desired.

A stationary cutting blade 88 is mounted on the rearward upper edge portion of the rearward surface of the support 18 so that its depending cutting edge surface projects horizontally across the upper limit of the stock receiving opening 34.

A crank arm 90 is secured to the axle 44 adjacent the rearward surface of the support 18. The crank arm 90 is rotated through an angle of not more than 180° in a to and fro reciprocating action about the axis of the axle 44 by the spur gears 46 and 48 partially rotating the driven gear 42 in the manner presently explained.

A connecting rod or pitman 92 extends between and is pivotally connected at its respective end portions to the free end of the crank arm and a blade guide 94 slidably mounted for vertical reciprocation between a pair of channels 96 vertically secured in spaced-apart relation to the rearward surface of the support 18 for movement of the blade guide 94 toward and away from the stationary blade 88. A movable blade 98 is secured to the upper limit of the blade guide 94 so that its upper horizntally disposed cutting edge intersects the path of stock disposed within or moving through the support opening 34 to effect a cutting or shearing action between the blades 88 and 98 during a shearing action as presently described.

A pair of shock absorber stops 100 and 102 are secured to the rearward surface of the support 18 in horizontally spaced-apart relation and are respectively positioned to be contacted by the free end portion of the crank arm 90 when in an at-rest position.

A relatively short finger 104 is secured to a peripheral portion of the crank arm in radially outward directed relation diametrically opposite the crank arm connection with the connecting rod 92. The free end portion of the finger 104 is characterized by converging or tapering surfaces for contacting and actuating limit switches forming a part of the control means to be presently described.

Referring now more particularly to the diagrams of FIGS. 8 through 13, the letters L1 and L2, respectively, indicate the two wires connected with a source of electrical energy, not shown. The letter S indicates a source of supply of fluid under pressure, not shown, while the letter E indicates an exhaust port or opening for release of fluid pressure. A conventional four-way two-position detented pilot operated air valve V1 has its two pairs of supply and exhaust ports S and E, respectively, connected with the air clutches 76 and 78. A pair of normally closed manual control air valves V2 and V3 are interposed in the supply line S and respectively connected with the pilots P at the respective ends of the valve V1. A pair of pilot operated air valves V4 and V5 are respectively interposed in the supply line S between the manual valves V2 and V3 and the pilots P at the respective ends of the control valve V1. A pair of exhaust lines 106 and 108 are respectively connected to the supply line S between the respective pilot valves V4 and V5 and the pilots P of the control valve V1. The exhaust lines 106 and 108 are each provided with a restrictor valve RV for the purposes presently explained.

A pair of limit switches LM1 and LM2 are mounted in spaced-apart relation on the support 18 in position to be actuated by the finger 104 as it is moved by the crank arm 90. The limit switches LM1 and LM2 are conventional, each comprising a pair of push button two-point-make type switches 110-112 and 114-116, respectively. The push button plate of each of the switches are interconnected by a shaft 118 and 120, respectively, so that when one of the pair of switches within each limit switch is closed the other switch within that limit switch is open. One end of each shaft 118 and 120 projects beyond the respective limit switch terminating in a ball or cam-like end portions 122 and 123 and are respectively contacted by the finger 104 when the crank arm 90 is positioned in its respective at-rest position. Each of the limit switches contain a resilient member, such as a spring 124 and 126, respectively, which normally urges the push button plate of the switches 112 and 116 to a closed position. One contact of the switches 110 and 114 is connected to the current source wire L1. The other contact of these two switches are connected together by a wire 128. Similarly, one contact of the switches 112 and 116 are connected together by a wire 130. The other contact of the switch 116 is connected, in series by wires 132 and 133, to the centrifugal switches 84 and 86 and current source wire L1. The other contact of the switch 112 is connected to one end of one coil of a solenoid SL of a two-position solenoid operated conventional air valve V6. The other solenoid SL2 of this valve V6 has one end of its coil connected to the wire 128. The other end of the coils of these two solenoids SL and SL2 are connected to the other current source wire L2. The supply port S of the valve V6 is connected by an air supply line 134 to the pilots P of the valves V4 and V5 and the power end of the power cylinders 52 and 54. The exhaust ports E of the power cylinders are open to the atmosphere.

FIG. 8 depicts the shear in an at-rest, ready-to-fire or shear position wherein the finger 104 maintains the switch 110 closed so that the solenoid SL actuates the valve V6 to supply air pressure to the power end of the cylinders 52 and 54 for a full charge of air pressure behind their pistons. As shown in FIG. 8, the spur gear connected end of the power cylinder piston rods 56 and 58 are positioned in off-set relation to the right of respective vertical diametric lines across the axes of the spur gears 46 and 48. Air pressure to the power cylinders has shifted the pilot controlled valves V4 and V5 to air pressure communicating position. The air clutch 78 is engaged which locks the cam clutch 82 and prevents rotation of the cog wheel 50 and spur gears 46 and 48. The centrifugal switches 84 and 86 are closed but the open contacts of switch 112 prevents both of the solenoids SL and SL2 from being energized simultaneously.

Figure 9:
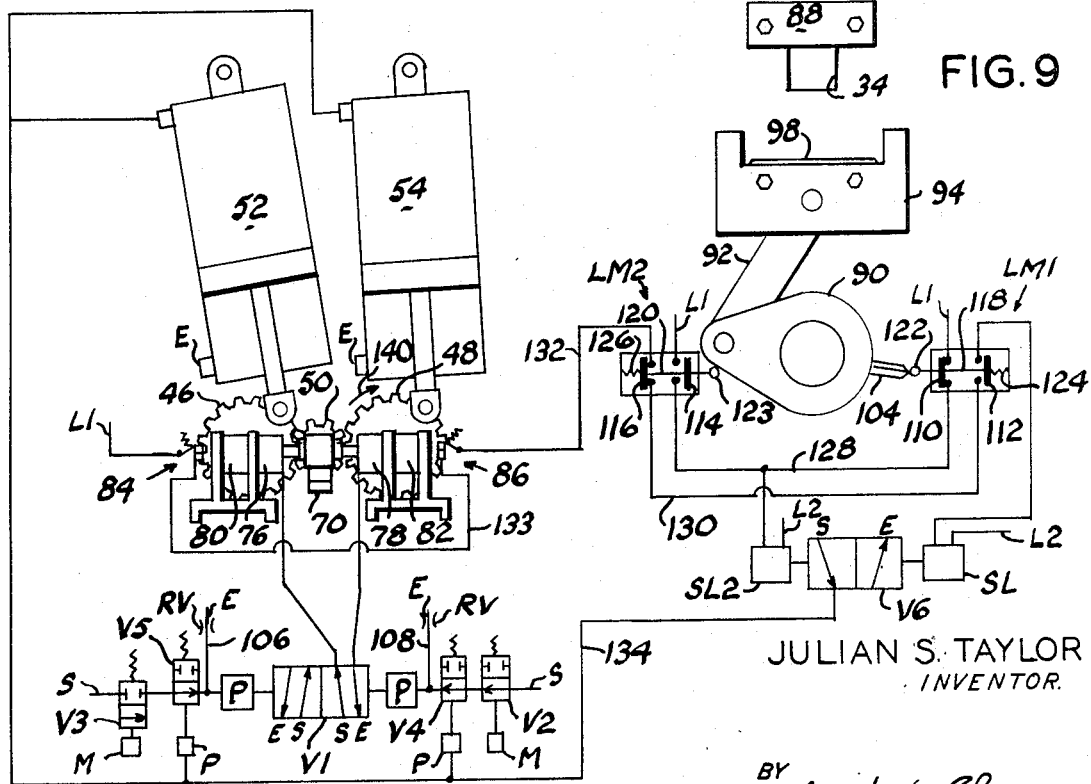
FIG. 9 is a diagrammatic view of the front and rear shear actuating components connected with pressure control means with the shear in a manually actuated signal-to-shear received position.

FIG. 9 illustrates the position of the shear components when it has received a "signal to shear". The power cylinders 52 and 54 are under full pressure. This signal to shear comprises manual actuation of the valve V2 to shift it to communicating position and apply pressure to the pilot P of the valve V1. The finger 104 is still maintaining the switch 110 closed. The valve V1 is thereby shifted to its position of FIG. 9 thus exhausting air pressure from the air clutch 78 which releases the one-way cam clutch 82 by removal of the resistance of the air clutch. The air clutch 76 and the cam clutch 80 are engaged but offer no resistance toward the movement of the spur gears 46 and 48 in the direction of the arrow 140.

Figure 10:
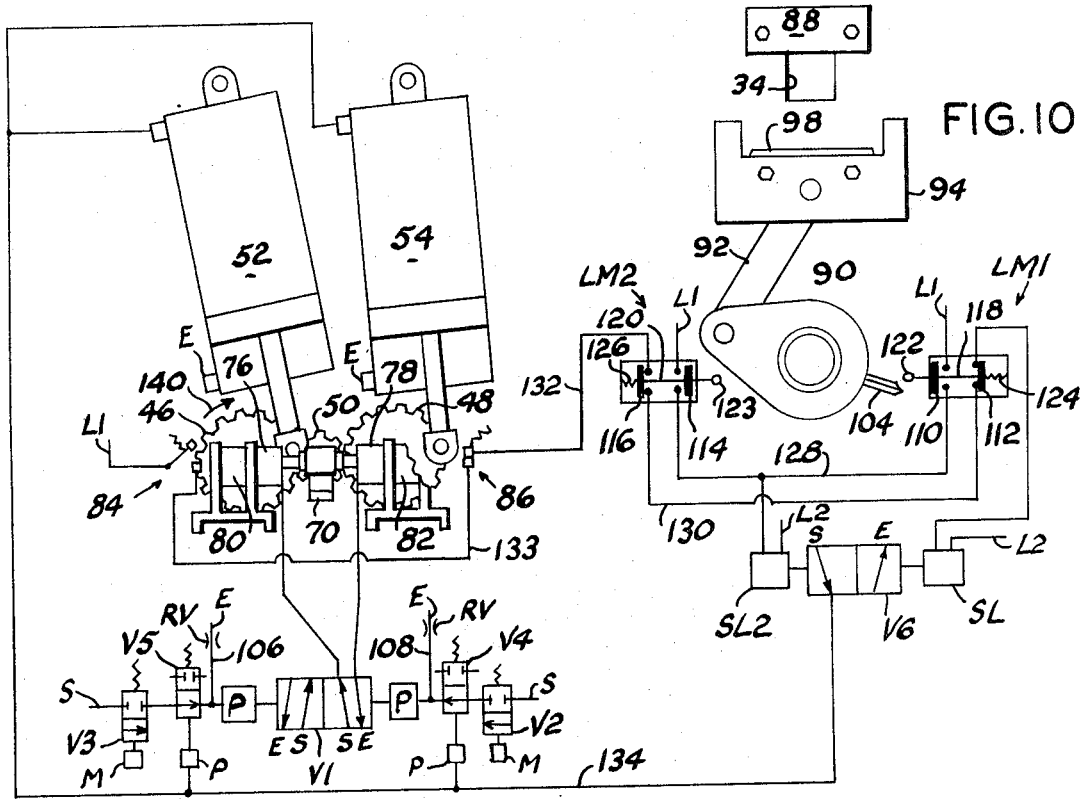
FIG. 10 is a diagrammatic view of the front and rear shear actuating components connected with pressure control means with the shear in a shearing stroke started position.

FIG. 10 illustrates the starting of the shearing stroke in which the power cylinders 52 and 54 continue to receive pressure from the air supply line 134. The limit switch LM1 is now in normal position by release from the finger 104 so that the switch 110 is open and the switch 112 is closed which are ineffective for the reason that rotation of the spur gears 46 and 48 results in the centrifugal switch 84 opening its contacts. The contacts of the centrifugal switch 86 remains closed because the air clutch 76 is engaged. The manually operated valve V2 has returned to normal closed position which does not affect the air supply to the air clutch 76 and the exhausting of the air clutch 78 for the reason that the valve V1 remains in its shifted position of FIG. 9.

Figure 11:
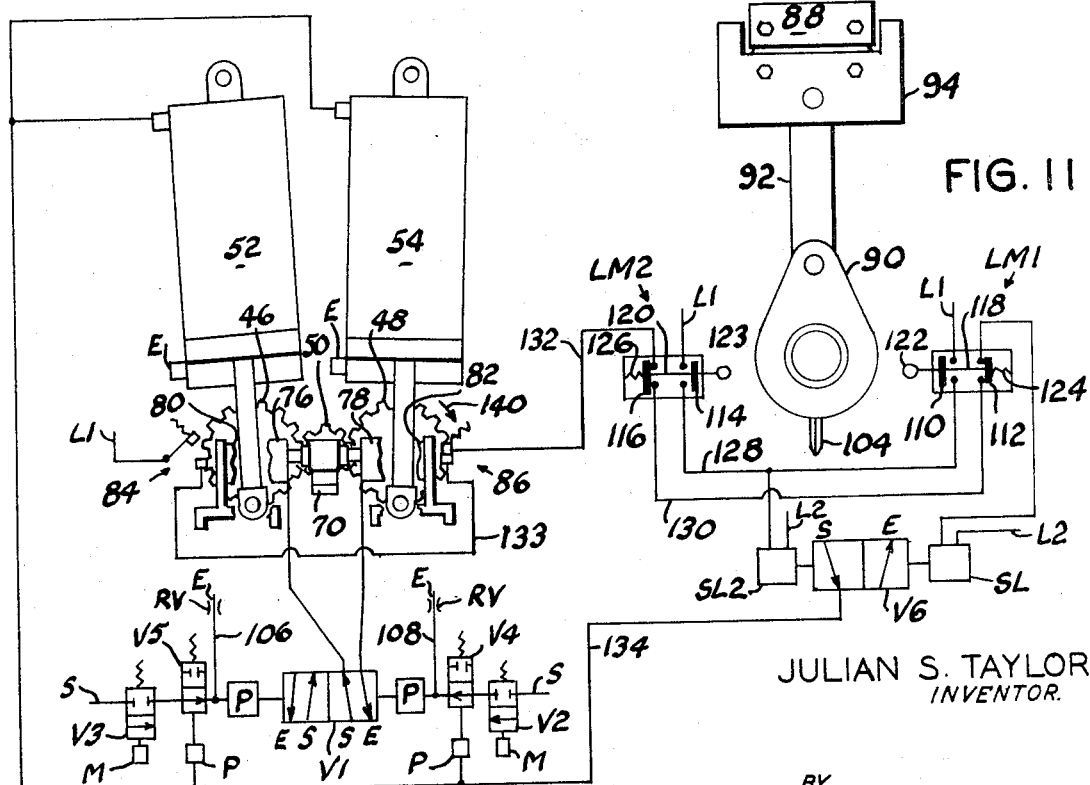
FIG. 11 is a diagrammatic view of the front and rear shear actuating components connected with pressure control means with the shear in stock cutting complete position.

FIG. 11 illustrates the completion of the cut or stock shearing action wherein the movable blade 98 has contacted the stationary blade 88 by the power cylinders 52 and 54 rotating the spur gears 46 and 48 and driving the driven gear 42 which rotates the crank arm 90. The power cylinders 52 and 54 are still receiving pressure from the supply line 134 and the limit switch LM1 is still in normal position and does not energize either of the solenoids for the reason that the speed of the gears 46 and 48 maintain the contacts of the centrifugal switch 84 open.

Figure 12:
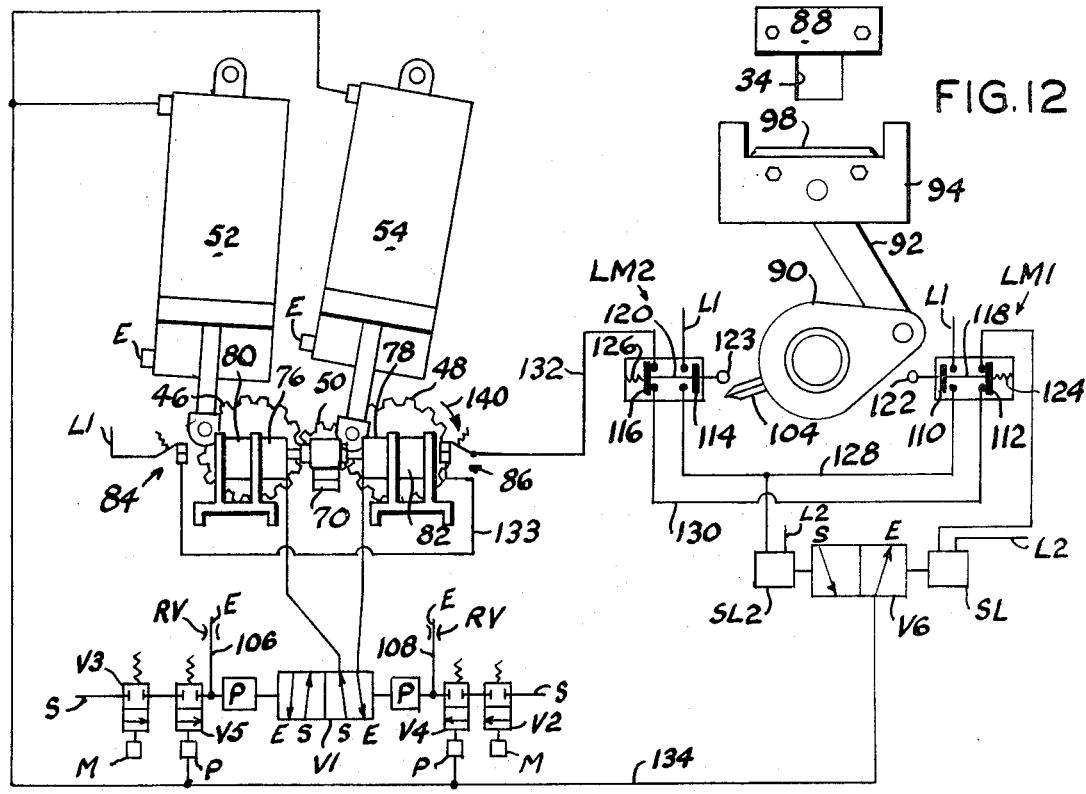
FIG. 12 is a diagrammatic view of the front and rear shear actuating components connected with pressure control means with the shear in speed reduced power cylinder cushion pressure bleed position; and, FIG. 13 is a diagrammatic view of the front and rear shear actuating components connected with pressure control means with the shear in power cylinder energizing position prior to receiving a subsequent signal-to-shear.

FIG. 12 illustrates the components position immediately following the completion of the shearing action in which the rotational velocity of the spur gears 46 and 48 is declining. The decline of the rotational velocity of the gears 46 and 48 is effected by the pistons of the cylinders 52 and 54 moving toward their power end and being cushioned by the air therein so that the decrease in rotational velocity permits the centrifugal switch 84 to close completing a circuit through the spring closed switch 112 to the solenoid SL which shifts the air valve V6 to exhaust air from the power end of the cylinders over the line 134. Exhausting air from the power cylinders permits the springs of the pilot controlled valves V4 and V5 to shift these valves to closed position. Air trapped in the supply line S between these valves V4 and V5 bleeds off through the exhaust lines 106 and 108 and their respective restrictor valves RV. Sufficient inertia remains in the gears rotational velocity to return the cylinders to their at-rest position and bring the crank arm 90 to a soft stop in contact with the shock absorber 102. The air clutch position remains as before with the air clutch 76 energized and the air clutch 78 exhausted for the reason that the control valve V1 remains in its previously shifted position. Thus an incomplete revolution of the spur gears 46 and 48 has been achieved for one cutting stroke and the air clutch 76, being under supply pressure and energized, prevents a shear action in the opposite direction.

Figure 13:
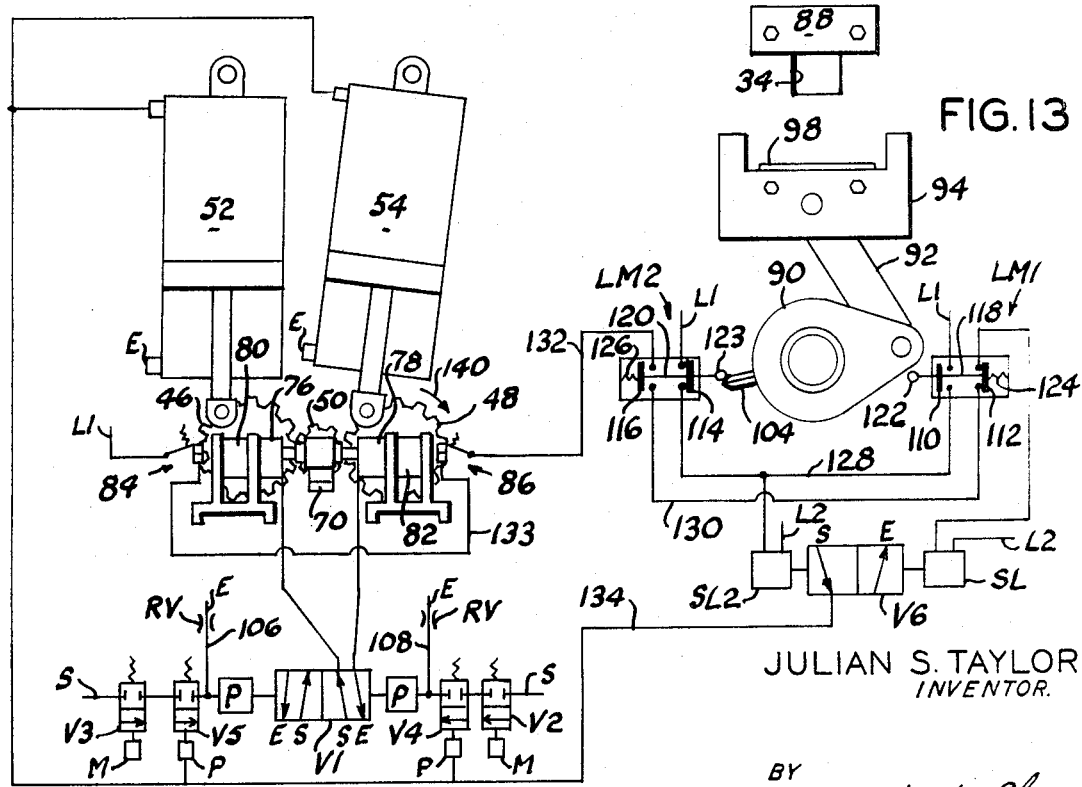

Referring also to FIG. 13, the shear has been stopped in an at-rest position wherein the piston rods, connected with the spur gears 46 and 48, are positioned in off-set relation, to the left of respective vertical diametric lines across the axes of the spur gears, as viewed in FIG. 13. In this position with the crank arm 90, in contact with the stop 102, the finger 104 has contacted the shaft end 123 of the limit switch LM2 closing switch 114, energizing the solenoid SL2 for shifting the valve V6 and applying pressure to the power end of the power cylinders 52 and 54 over the line 134, thus building up pressure in the power cylinders for a subsequent shear in the opposite direction. Pressure build up to shearing pressure in the line 134 will shift the valves V4 and V5 to air pressure communicating position as shown by FIG. 8.

The second shearing action is accomplished by actuating the manual valve V3 which applies pressure to the other pilot P of the valve V1 to shift it back to the position of FIG. 8 wherein air supply is now applied to the air clutch 78 and exhausting the air clutch 76 thus starting a cutting cycle by rotating the spur gears 46 and 48, as described hereinabove, but in an opposite direction which returns the crank arm 90 to its position of FIG. 8 after completing a second shearing action.

During the shearing action when stock is moving through the support aperture 34, the support is tilted by the tilting cylinders 26 having their supply ports connected with a manually controlled air valve V7 (FIG. 7) so that as the respective manual valve V2 or V3 is actuated this manual valve V7 is also actuated to supply air to the power end of the tilting cylinders to tilt the support 18 in the direction of stock movement, as illustrated by the dotted lines (FIGS. 2 and 7). This valve V7 is shifted to its opposite position from that shown in FIG. 7, to return the support 18 to a vertical upright position at the termination of the shearing cycle which may be accomplished manually or by stops, not shown.

Obviously the invention is susceptible to changes or alterations without defeating its practicability, therefore, I do not wish to be confined to the preferred embodiments shown in the drawings and described herein.

I claim:

1. A flying shear for longitudinally moving stock, comprising:
 a frame having an opening for passing stock to be cut;
 a stationary blade mounted on said frame adjacent the opening therein;
 a movable blade slidably supported by said frame;
 crank means journalled by said frame for moving said movable blade toward and away from said stationary blade;
 gear means mounted on said frame and connected with said crank means;

power cylinder means connected with said gear means for operating said crank means;

clutch means operatively connected with said gear means permitting rotational movement of the gears of said gear means in first one direction and then in the opposite direction;

means for supplying fluid under pressure to said power cylinder means; and, means controlling the supply of fluid to the power end of said cylinder means to effect a cutting stroke.

2. The flying shear according to claim 1 in which said gear means includes:

a driven gear;

a pair of spur gears meshing with said driven gear and journalled in spaced-apart relation by said frame;

a cog wheel interposed between and meshing with said pair of spur gears; and, a gear train connected with said cog wheel, said gear train having oppositely disposed oppositely rotating output shafts.

3. The flying shear according to claim 2 in which said clutch means includes:

a pair of fluid pressure operated clutches connected, respectively, with said output shafts for braking and releasing said output shafts; and, a pair of one-way cam clutches connected, respectively, with said pressure operated clutches.

4. The flying shear according to claim 3 in which said fluid supplying means includes:

a fluid pressure clutch operating valve;

a power cylinder solenoid operated valve; and, means connecting said valves with a source of fluid under pressure and connecting said valves with said fluid pressure clutches and said power cylinders, respectively.

5. The flying shear according to claim 4 and further including:

a pair of limit switch means mounted on said frame adjacent said crank means;

a finger connected with said crank means for opening and closing said limit switch means, respectively, in response to the respective direction of movement of said crank means;

a pair of centrifugal force responsive members connected with and driven, respectively, by the output shafts of said gear train; and, wiring connecting a source of electrical energy with said centrifugal force responsive members in series with said pair of limit switch means and connecting said pair of limit switch means with said solenoid operated valve.

6. The flying shear according to claim 5 and further including:

stop means mounted on said frame for limiting the respective direction of rotation of said driven gear to an incomplete revolution.

7. The flying shear according to claim 1 in which said frame comprises:

a base;

an upright support connected with said base for vertical pivoting movement about a horizontal axis;

a tilting cylinder connected with said base and said support; and, valve means connecting said tilting cylinders with said controlling means for tilting said support in the direction of movement of stock being cut during each cutting stroke of said movable blade.

* * * * *